(12) United States Patent
Kobayashi et al.

(10) Patent No.: US 7,377,178 B2
(45) Date of Patent: May 27, 2008

(54) STRAIN DETECTOR HAVING A DISPLACEABLE INSULATING SUBSTRATE

(75) Inventors: Yasunobu Kobayashi, Fukui (JP); Shigehiro Yoshiuchi, Osaka (JP); Yasunori Matsukawa, Fukui (JP); Hiroaki Mouri, Fukui (JP); Kazuhiko Miyagoshi, Fukui (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 47 days.

(21) Appl. No.: 10/569,416

(22) PCT Filed: Sep. 8, 2004

(86) PCT No.: PCT/JP2004/013388

§ 371 (c)(1),
(2), (4) Date: Feb. 23, 2006

(87) PCT Pub. No.: WO2005/026679

PCT Pub. Date: Mar. 24, 2005

(65) Prior Publication Data
US 2007/0084294 A1    Apr. 19, 2007

(30) Foreign Application Priority Data

Sep. 9, 2003  (JP) .............................. 2003-316353
Jan. 14, 2004 (JP) .............................. 2004-006569

(51) Int. Cl.
*F16B 31/02*  (2006.01)

(52) U.S. Cl. .......................................... 73/761; 73/760
(58) Field of Classification Search ........... 73/760–761
See application file for complete search history.

(56) References Cited

U.S. PATENT DOCUMENTS

| 3,577,779 | A  | * | 5/1971  | Laimins ................ 73/862.633 |
| 4,695,963 | A  | * | 9/1987  | Sagisawa et al. ........... 700/258 |
| 6,293,160 | B1 | * | 9/2001  | Shigemoto ............. 73/862.632 |
| 6,411,193 | B1 | * | 6/2002  | Chen ........................... 338/47 |
| 6,693,624 | B1 | * | 2/2004  | Niiyama ..................... 345/161 |
| 2002/0033283 | A1 | | 3/2002 | Miura et al. |

FOREIGN PATENT DOCUMENTS

| JP | 8-087375   | 4/1996 |
| JP | 10-281904  | 10/1998 |
| JP | 2002-090232 | 3/2002 |
| JP | 2002-139373 | 5/2002 |

* cited by examiner

*Primary Examiner*—Max Noori
(74) *Attorney, Agent, or Firm*—Wenderoth, Lind & Ponack, L.L.P.

(57) ABSTRACT

The present invention provides a strain detector improved in output characteristic, in which no internal stress is generated in strain resistance elements even with it fixed on a fixing member. The strain detector is configured in that a detection hole is provided nearly at the center of a insulating substrate, a fixing hole is formed at the position of peripheral end, a portion around the detection hole is pressed by a pressing member, one holding member and the other holding member are provided with fixing holes opposing to the fixing holes of the insulating substrate, and the peripheral end of the insulating substrate is fixed by the fixing member inserted. Accordingly, the detection hole in the insulating substrate is peripherally displaceable in a vertical direction with respect to one holding member and the other holding member.

9 Claims, 14 Drawing Sheets

STRAIN DETECTOR HAVING A DISPLACEABLE INSULATING SUBSTRATE

This application is a U.S. national phase application of PCT International Publication PCT/JP2004/013388.

TECHNICAL FIELD

The present invention relates to a strain detector for detecting a strain generated due to addition of a load in particular.

BACKGROUND ART

Figure 19:
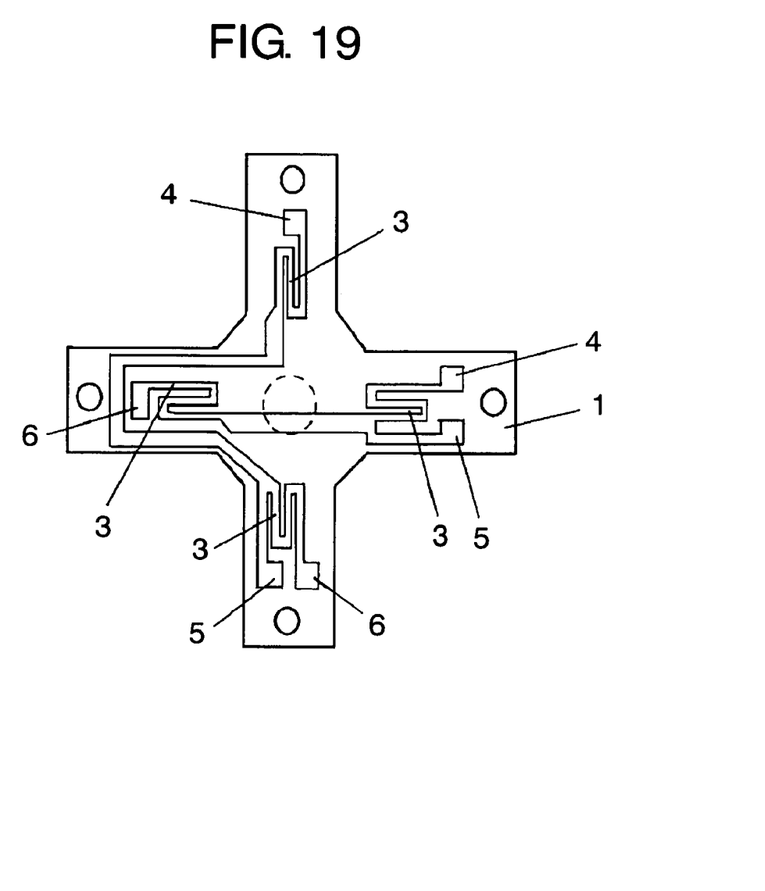
FIG. 19 is a bottom view of a conventional strain detector.
Figure 20:
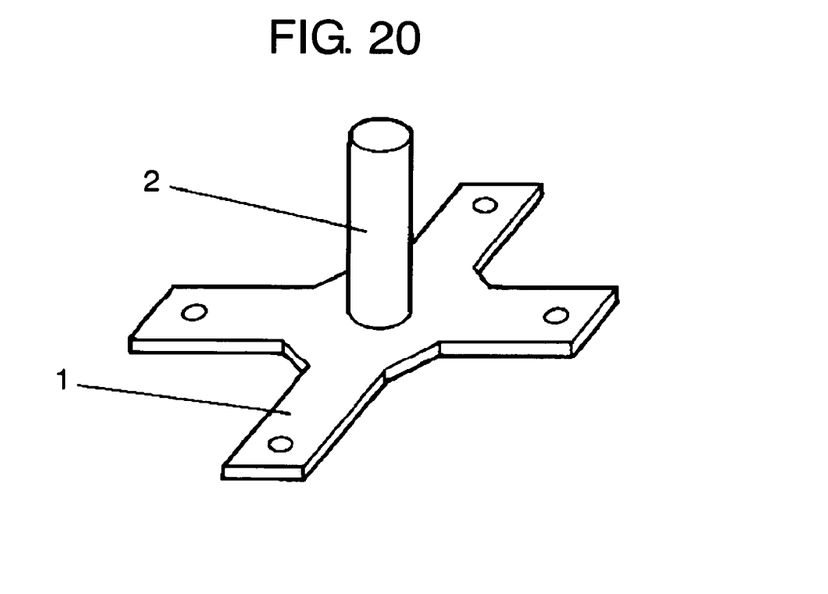
FIG. 20 is a perspective view of a conventional strain detector.

A conventional strain detector of this type has a configuration as shown in FIG. 19 and FIG. 20.

FIG. 19 is a bottom view of a conventional strain detector, and FIG. 20 is a perspective view of the strain detector. In FIG. 19 and FIG. 20, insulating substrate 1 is formed from elastic material, which is disposed at the bottom of pressing member 2. Also, four strain resistance elements 3 are provided at the bottom of the insulating substrate 1. The strain resistance elements 3 are electrically connected to a pair of power electrodes 4, a pair of output electrodes 5, and a pair of GND electrodes 6, thereby forming a bridge circuit.

The operation of a conventional strain detector having such a configuration will be described in the following discussion.

Figure 21:
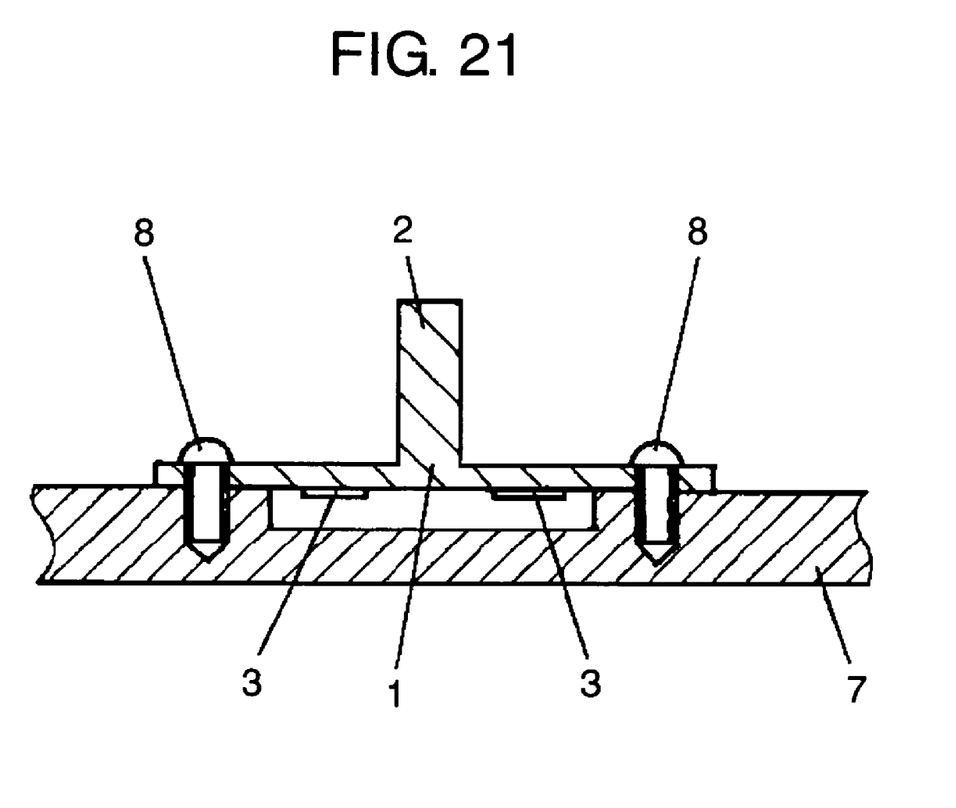
FIG. 21 is a side sectional view of a conventional strain detector.

As shown in FIG. 21, when a pressing force is applied by pressing member 2 to the top nearly at the center of insulating substrate 1 after fixing a conventional strain detector on fixing member 7 by using male screws 8, a bending moment is generated in insulating substrate 1 due to the pressing force. Due to the bending moment, a bending moment is also generated in each of four strain resistance elements 3 disposed at the bottom of insulating substrate 1. And, when a bending moment is generated in strain resistance element 3, it causes the resistance value of strain resistance element 3 to change. Accordingly, the change of the resistance value is outputted from a pair of output electrodes 5 to an external computer (not shown), and thereby, the pressing force applied to insulating substrate 1 is measured.

Such a conventional strain detector is, for example, disclosed in Japanese Laid-Open Patent H8-87375.

SUMMARY OF THE INVENTION

In a first aspect of the present invention, a strain detector comprises an insulating substrate having at least two strain resistance elements and a circuit electrically connected to the strain resistance elements, and a member for fixing the insulating substrate.

A detection hole is disposed nearly at the center of the insulating substrate, a portion around the detection hole is pressed by a pressing member, and the detection hole in the insulating substrate is peripherally displaceable in a vertical direction with respect to the member for fixing the insulating substrate.

In a second aspect of the present invention, a strain detector comprises an insulating substrate having at least two strain resistance elements and a circuit electrically connected to the strain resistance elements, and a pair of holding members for holding the insulating substrate.

A detection hole is disposed nearly at the center of the insulating substrate, and a fixing hole is disposed at the peripheral end zone thereof.

A portion around the detection hole is pressed by a pressing member, and the pair of holding members are provided with fixing holes opposing to the fixing holes of the insulating substrate.

A fixing member is inserted into each of the fixing holes of the holding member and the fixing holes of the insulating substrate, securing the peripheral ends of the insulating substrate, and thereby, the detection hole in the insulating substrate is peripherally displaceable in vertical direction with respect to the pair of holding members.

DETAILED DESCRIPTION OF THE PREFERRED EMBODIMENTS

However, in the conventional configuration described above, when the strain detector is fixed by male screw 8 on fixing member 7, a twisting force is generated due to the screw tightening torque, and an internal stress is generated in insulating substrate 1. Accordingly, internal stress is also generated in strain resistance element 3. Thus, even when no pressing force is applied to pressing member 2, an output signal from a pair of output electrodes 5 is detected as if a pressing force is being applied to pressing member 2, and therefore, there arises a problem in that the output signal of the strain detector becomes unstable.

The present invention is intended to solve the above conventional problem. The object of the invention is to provide a strain detector improved in output characteristic, wherein no internal stress is generated in the strain detector even with the strain detector fixed on a fixing member.

A strain detector in the preferred embodiment of the present invention will be described in the following discussion with reference to the drawings.

Preferred Embodiment 1

Figure 1:
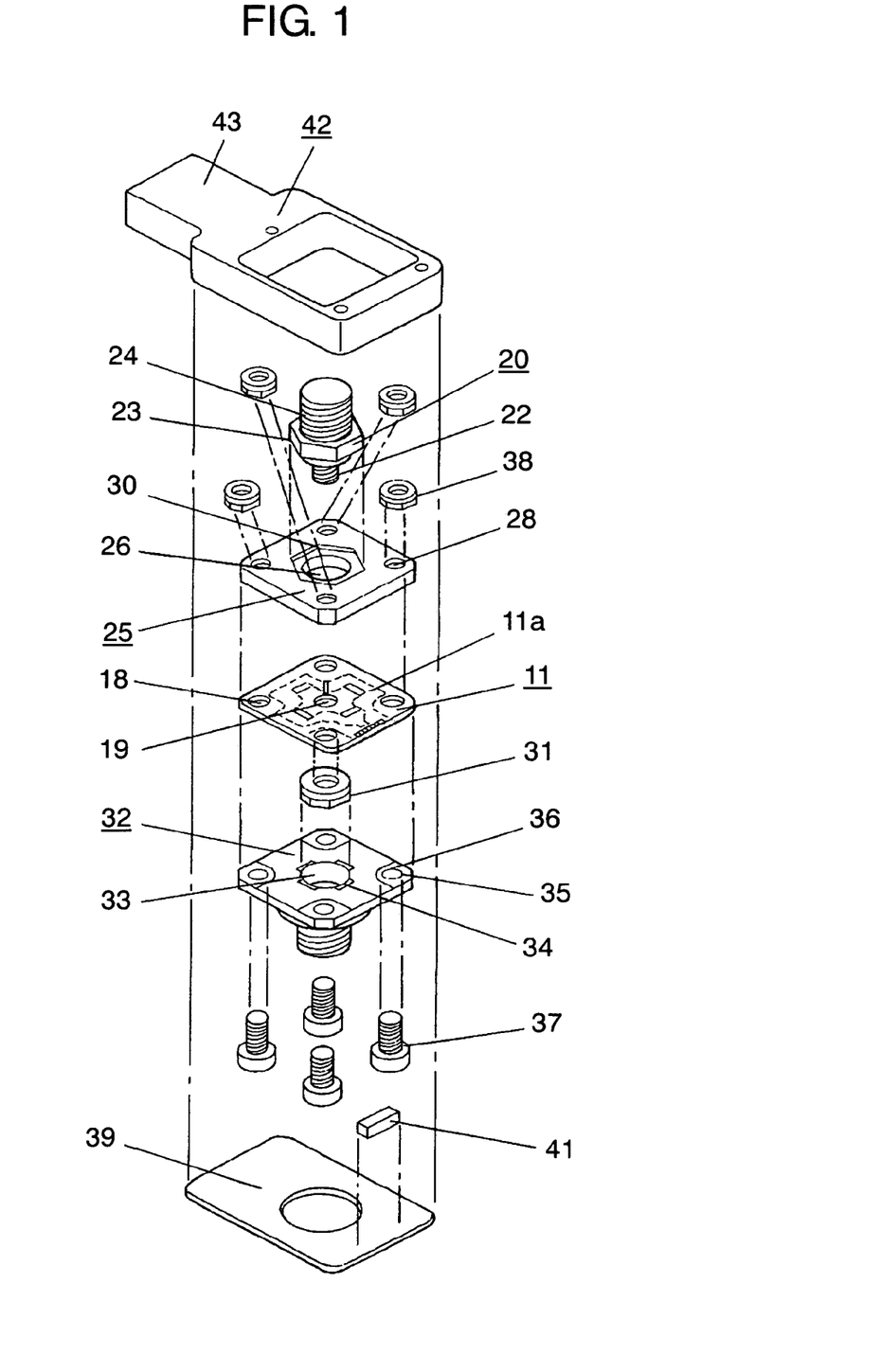
FIG. 1 is an exploded perspective view of a strain detector in one preferred embodiment of the present invention.
Figure 2:
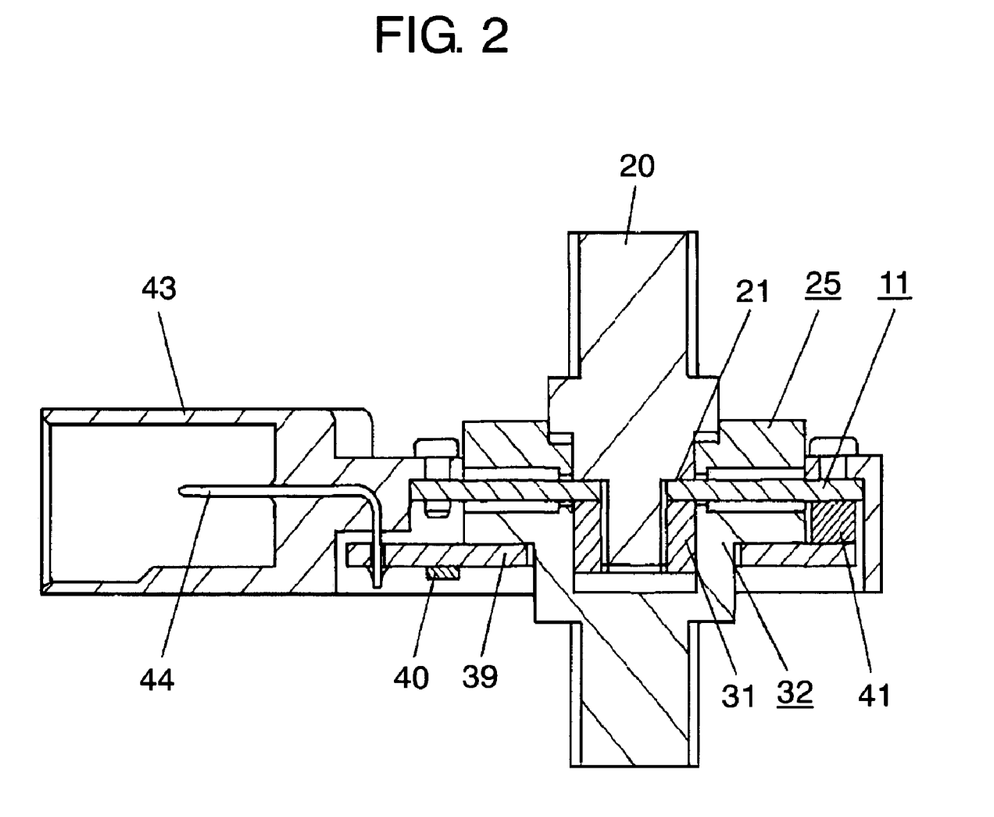
FIG. 2 is a side sectional view of a strain detector in one preferred embodiment of the present invention.
Figure 3:
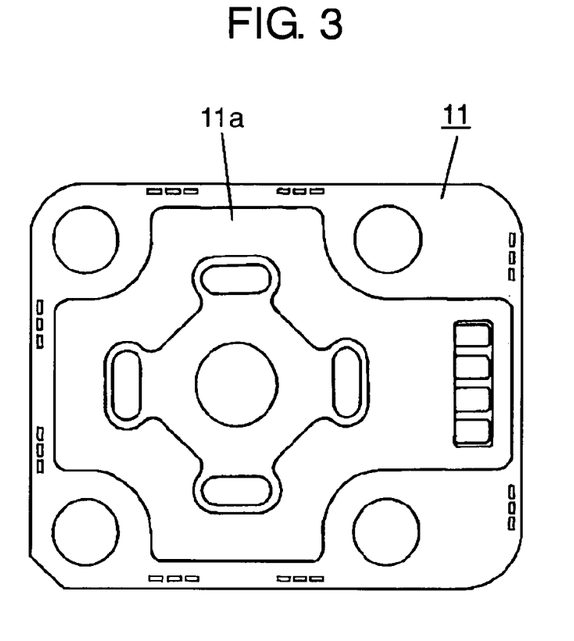
FIG. 3 is a bottom view of an insulating substrate of a strain detector in one preferred embodiment of the present invention.
Figure 4:
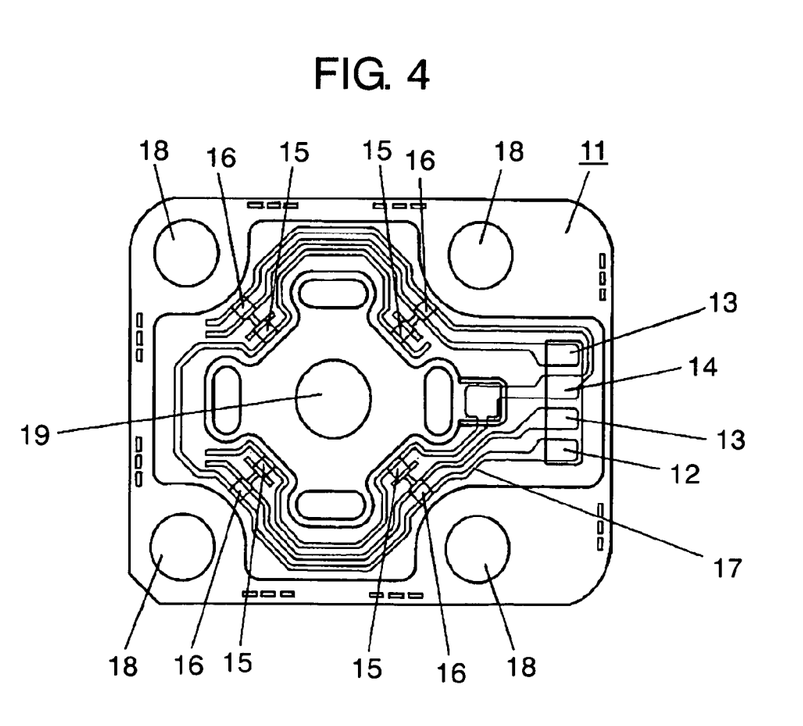
FIG. 4 is a bottom view of an insulating substrate with a protective layer removed in one preferred embodiment of the present invention.
Figure 5:
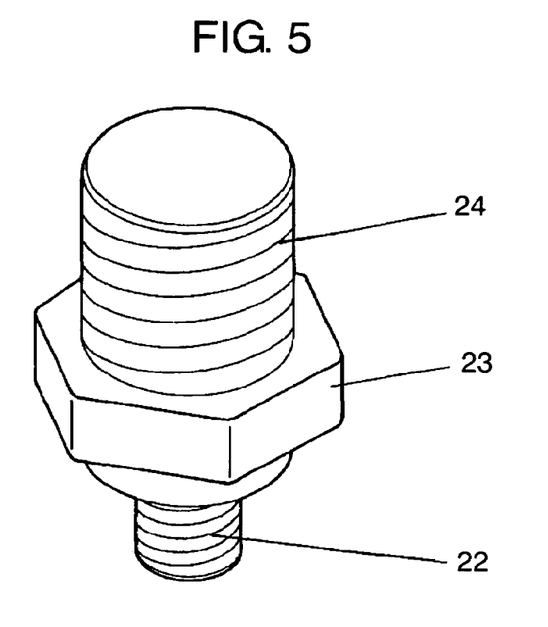
FIG. 5 is a perspective view of a pressing member of a strain detector in one preferred embodiment of the present invention.
Figure 6:
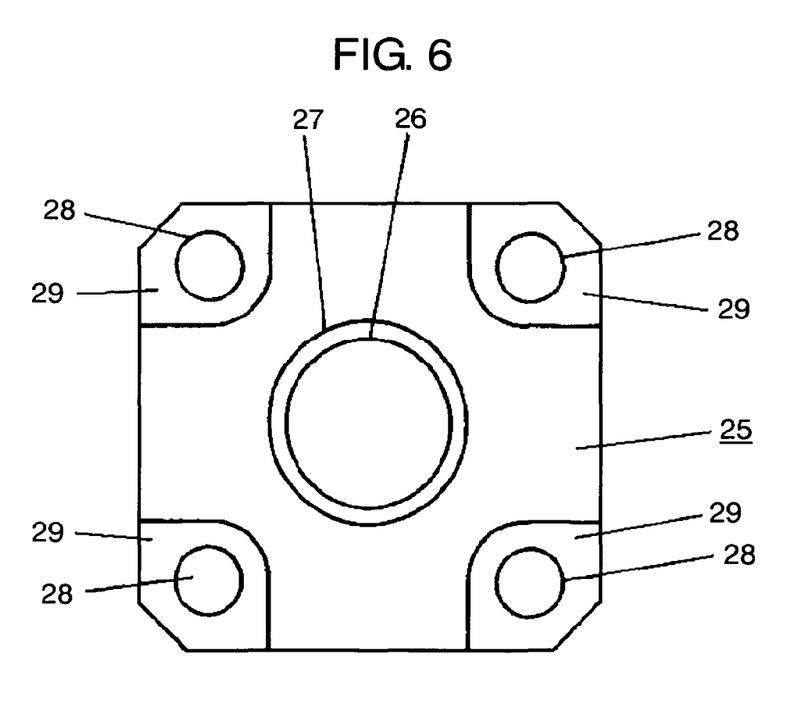
FIG. 6 is a bottom view of a first holding member of a strain detector in one preferred embodiment of the present invention.
Figure 7:
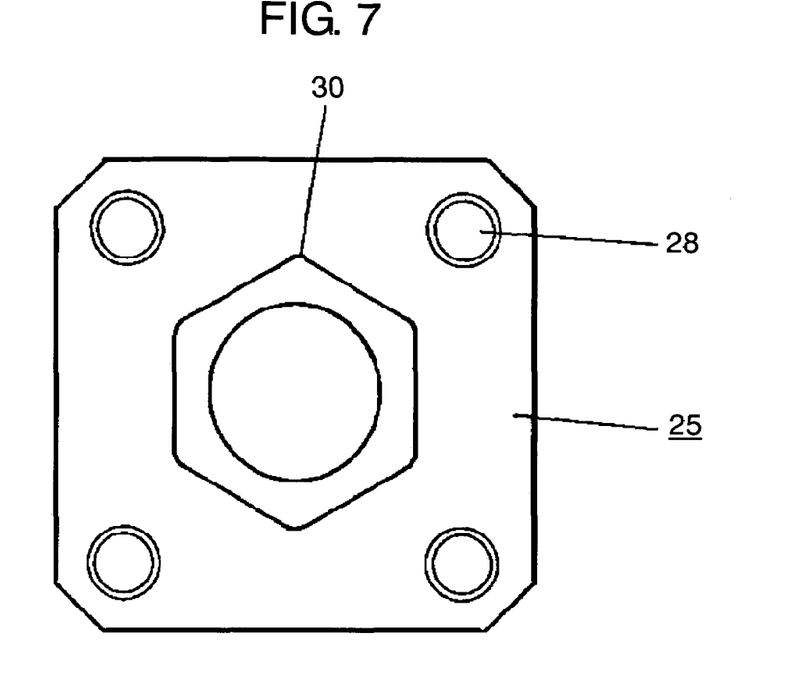
FIG. 7 is a top view of a first holding member of a strain detector in one preferred embodiment of the present invention.
Figure 8:
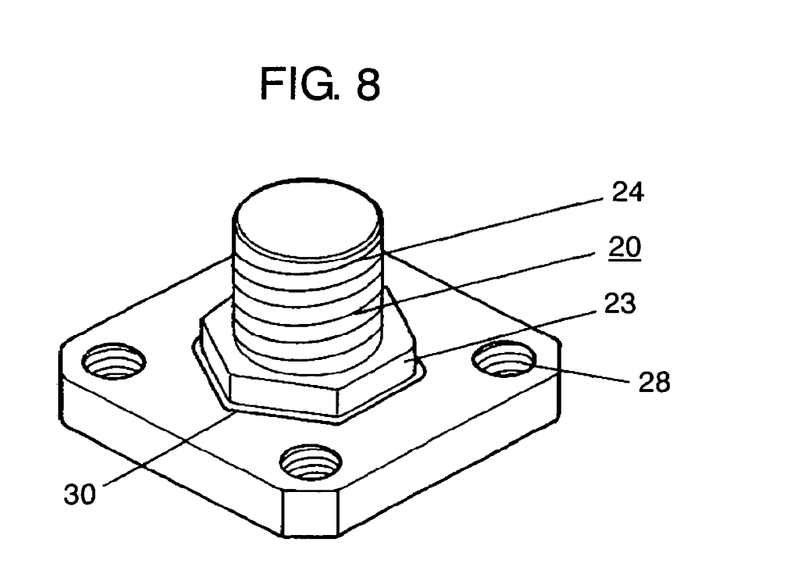
FIG. 8 is a perspective view of a first holding member with a pressing member of a strain detector in one preferred embodiment of the present invention.
Figure 9:
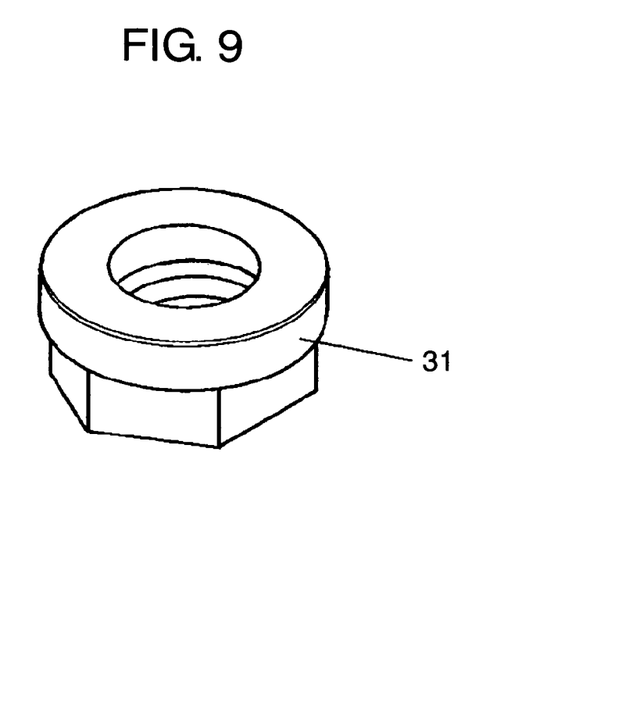
FIG. 9 is a perspective view of a fixing member of a strain detector in one preferred embodiment of the present invention.
Figure 10:
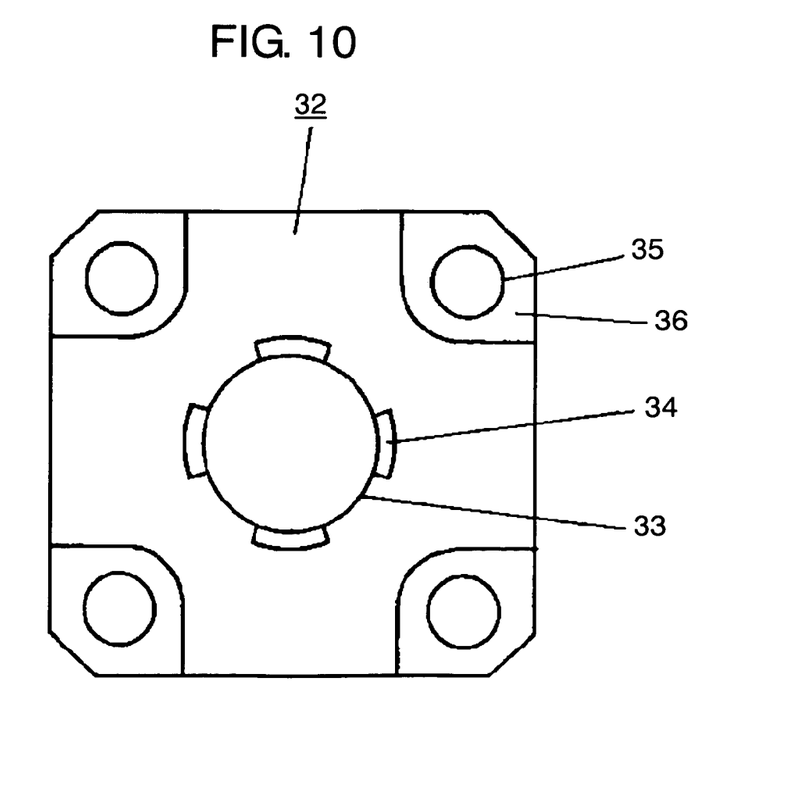
FIG. 10 is a top view of a second holding member of a strain detector in one preferred embodiment of the present invention.

FIG. 1 is an exploded perspective view of a strain detector in the preferred embodiment 1 of the present invention. FIG. 2 is a side sectional view of the strain detector. FIG. 3 is a bottom view of an insulating substrate of the strain detector. FIG. 4 is a bottom view of the insulating substrate with a protective layer removed. FIG. 5 is a perspective view of a pressing member of the strain detector. FIG. 6 is a bottom view of a first holding member of the strain detector. FIG. 7 is a top view of a first holding member of the strain detector. FIG. 8 is a perspective view of a first holding member with a pressing member mounted thereon of the strain detector. FIG. 9 is a perspective view of a fixing member of the strain detector. FIG. 10 is a top view of a second holding member of the strain detector.

In FIG. 1 to FIG. 10, insulating substrate 11 is formed from stainless material containing about 0.1% by weight of nickel, which is generally square-shaped. At the bottom of insulating substrate 11, as shown in FIG. 4, there are provided power electrode 12 made of silver, a pair of output electrodes 13, GND electrode 14, four compressive strain resistance elements 15 and tensile strain resistance elements 16 which are electrically connected by circuit 17, thereby forming a bridge circuit. Also, as shown in FIG. 3, protective layer 11a is disposed in such a manner as to cover compressive strain resistance element 15, tensile strain resistance element 16, and circuit 17 at the bottom of insulating substrate 11. Further, insulating substrate 11 is formed with fixing holes 18 positioned at peripheral ends in four corners thereof extending from top to bottom, and also, detection hole 19 is provided nearly at the center of insulating substrate 11 extending from top to bottom. Pressing member 20 is formed from stainless material containing about 4% by weight of nickel. The pressing member 20 is provided with abutment 21 which presses a portion adjacent to the top of detection hole 19 of insulating substrate 11, and as shown in FIG. 5, external thread 22 is formed over the outside surface of the lower part of the member.

Also, detent 23 is provided at the central outside in the longitudinal direction of pressing member 20, and external thread 24 is formed over the outside surface of the upper part. First holding member 25 made of metal is, as shown in FIG. 6, formed with pressing member insertion hole 26 nearly at the center thereof, and also, projection 27 is provided around the bottom of pressing member insertion hole 26.

Also, fixing holes 28 are formed in four corners of first holding member 25 extending from top to bottom, and also, holding abutments 29 are disposed around the four fixing holes 28 at the bottom of first holding member 25 in such a manner as to be flush with each other. Further, at the upper surface of first holding member 25, hexagonal stop portion 30 that is a step positioned at the upper side of insertion hole 26 is provided. As shown in FIG. 8, detent 23 of pressing member 20 is stopped by the stop portion 30. Further, external thread 22 of pressing member 20 is inserted into detection hole 19 of insulating substrate 11 via pressing member insertion hole 26 of first holding member 25, and the external thread 22 protruded downward is threaded into fixing member 31 formed of a nut shown in FIG. 9.

Second holding member 32 made of metal is formed with stopper hole 33 in a downward direction from the upper surface nearly at the center thereof, and the lower part formed of external thread 22 of pressing member 20 is received in the stopper hole 33. Also, four projections 34 are provided around the upper surface of stopper hole 33 of second holding member 32. In addition, four projections 34 of second holding member 32 are configured in that compressive strain resistance element 15 and tensile resistance element 16 of insulating substrate 11 are arranged at positions opposite to portions not provided with projection 34.

Further, fixing holes 35 are disposed in four corners of second holding member 32 extending from top to bottom, and holding abutments 36 are disposed around four fixing holes 35 at the upper surface of second holding member 32 in such a manner as to be flush with each other. Further, fixing member 37 formed of four screws is inserted into each of four fixing holes 28 of first holding member 25, four fixing holes 18 of insulating substrate 11, and four fixing holes 35 of second holding member 32. In addition, four nuts 38 are threaded onto fixing member 37, and thereby, insulating substrate 11 is held by holding abutment 29 of first holding member 25 and holding abutment 36 of second holding member 32 so that the detection hole 19 of insulating substrate 11 is peripherally displaceable in a vertical direction with respect to first holding member 25 and second holding member 32.

Circuit board 39 is mounted with IC40 at the bottom thereof, and the IC40 is electrically connected to power electrode 12, a pair of output electrodes 13, and GND electrode 14 of insulating substrate 11 via conductive member 41 formed of metallic wire and silicone rubber.

Case 42 is formed with connector 43 which is protruded outside. Six connector terminals 44 are provided inside the connector 43, and the connector terminals 44 are electrically connected to IC40 of circuit board 39.

The assembling method for a strain detector configured as described above in one preferred embodiment of the present invention will be described in the following discussion.

First, glass paste (not shown) is printed on the bottom surface of a stainless plate (not shown), and after that, the plate is burned at about 850° C. for about 10 minutes to form insulating substrate 11.

In this case, since the materials used for forming pressing member 20 and insulating substrate 11 are different from each other, it brings about such an advantage that insulating substrate 11 can be formed by using a material having less alteration of a linear expansion coefficient due to temperature change and capable of enduring the printing and burning of compressive strain resistance element 15 and tensile strain resistance element 16.

Next, silver paste (not shown) is printed on the bottom surface of insulating substrate 11 and burned at about 850° C. for about 10 minutes to form power electrode 12, a pair of output electrodes 13, GND electrode 14, and circuit 17 on the underside of insulating substrate 11.

Subsequently, metal glazing type paste (not shown) is printed at the positions of compressive strain resistance element 15 and tensile strain resistance element 16 on the underside of insulating substrate 11, and after that, it is dried at about 130° C. for about 10 minutes.

Next, insulating substrate 11 is burned at 850° C. for about 10 minutes, and four compressive strain resistance elements 15 and four tensile strain resistance elements 16 are formed on insulating substrate 11.

Next, glass paste (not shown) is printed on the upper surface of insulating substrate 11, except power electrode 12, a pair of output electrodes 13, and GND electrode 14 of insulating substrate 11, and after that, it is burned at about 640° C. for about 10 minutes to form protective layer 11a on the bottom surface of insulating substrate 11.

Subsequently, after first holding member 25 is abutted on the upper surface of insulating substrate 11, external thread 22, lower part of pressing member 20, is inserted from above into pressing member insertion hole 26 of first holding member 25 and detection hole 19 of insulating substrate 11. At the same time, detent 23 of pressing member 20 is received by stop portion 30 of first holding member 25.

Next, fixing member 31 formed of a nut is threaded up onto external thread 22 of pressing member 20, and thereby, abutment 21 of pressing member 20 is abutted on a portion close to the upper surface of detection hole 19 of insulating substrate 21.

Subsequently, external thread 22 of pressing member 20 and fixing member 31 formed of a nut are stored in stopper hole 33 of second holding member 32. At the same time, the bottoms around four fixing holes 18 of insulating substrate 11 are abutted on holding abutment 36 of second holding member 32.

Next, fixing member 37 formed of four screws are threaded up onto four fixing holes 35 of second holding member 32, fixing hole 18 of insulating substrate 11, and fixing hole 28 of first holding member 25, which are then fastened with nut 38. In this way, insulating substrate 11 is held between holding abutment 29 of first holding member 25 and holding abutment 36 of second holding member 32.

Further, the holding member is formed of first holding member 25 and second holding member 32. Therefore, fastening the first holding member 25 to the second holding member 32 by screwing is just enough to hold the insulating substrate 11 between the holding members, and thereby, it is possible to easily hold the insulating substrate 11 between holding members.

Finally, circuit board 39 mounted with IC40 in advance is fixed on second holding member 32. After that, first holding member 25, insulating substrate 11, second holding member 32, and circuit board 39 are mounted in case 42, followed by soldering connector terminal 44 of case 42 to circuit board 39.

In this case, since a stress is generated in insulating substrate 11 when insulating substrate 11 is held between first holding member 25 and second holding member 32, the matter is examined here. In a strain detector in one preferred embodiment of the present invention, there is provided circuit board 39 having IC40 electrically connected to power electrode 12, a pair of output electrodes 13, and GND electrode 14 of insulating substrate 11. Accordingly, the change in resistance value of compressive strain detect element 15 and tensile strain detect element 16 due to the stress generated in insulating substrate 11 when insulating substrate 11 is held between first holding member 25 and second holding member 32 can be corrected by IC40. As a result, it is possible to improve the output signal accuracy of the strain detector.

The operation of the strain detector in one preferred embodiment of the present invention, which is formed and assembled as described above will be described in the following discussion.

First, external thread 24 of pressing member 20 is fastened to a fixing member (not shown).

In this case, as shown in FIG. 8, detent 23 of pressing member 20 is stopped by stop portion 30 shown in FIG. 7 which is disposed on first holding member 25. Therefore, when pressing member 20 of the strain detector is screwed to a fixing member (not shown), excessive rotational torque is applied to pressing member 20, then detent 23 of pressing member 20 is stopped after rotating against first holding member 25. As a result, the engagement of external thread 22 of pressing member 20 and fixing member 31 formed of a nut is not loosened by excessive forces applied. Accordingly, it is possible to improve the reliability in fixing the strain detector on a fixing member (not shown).

Figure 11:
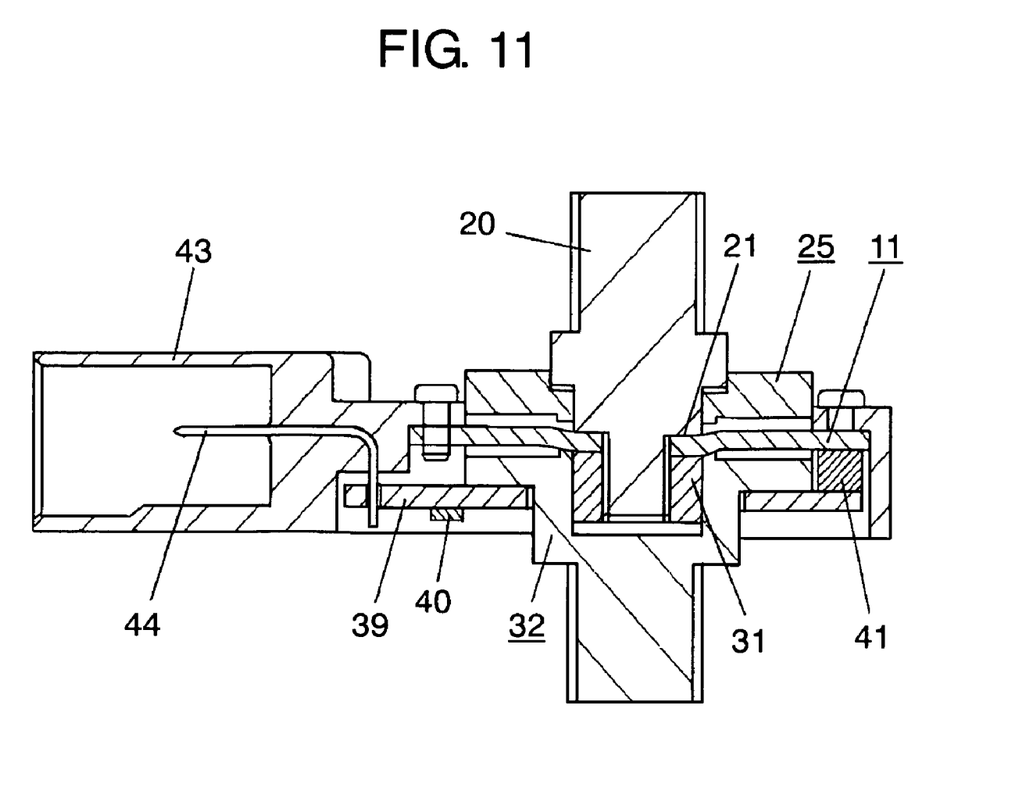
FIG. 11 is a side sectional view showing the operation of a strain detector in one preferred embodiment of the present invention.

When a pressing force is applied from above to pressing member 20, the pressing force causes a strain to be generated in the surface of insulating substrate 11, and then a compressive stress is applied to four compressive strain resistance elements 15 disposed on the upper surface of insulating substrate 11. At the same time, a tensile stress is applied to four tensile strain resistance elements 16. Further, when strain is generated in compressive strain resistance element 15 and tensile strain resistance element 16, it causes the resistance values of compressive strain resistance element 15 and tensile strain resistance element 16 to be changed. The alteration of the resistance values is outputted from a pair of output electrodes 13 to an external computer (not shown) as an output from a bridge circuit in order to measure the load applied to the insulating substrate 11.

Here, a matter of unexpectedly great pressing force applied from above pressing member 20 of the strain detector is examined. In the strain detector in one preferred embodiment of the present invention, projection 34 is provided around the upper surface of stopper hole 33 of second holding member 32. Accordingly, when an excessive pressing force is applied from above to pressing member 20, the bottom of insulating substrate 11 abuts on projection 34 of second holding member 32. In this way, because insulating substrate 11 is prevented from flexing furthermore, insulating substrate 11 is free from plastic deformation. As a result, the flexibility of insulating substrate 11 is stabilized, and it is possible to improve the reliability of the strain detector.

Also, a matter of more excessive pressing force applied from above pressing member 20 of the strain detector is examined here. In the strain detector in one preferred embodiment of the present invention, stopper hole 33 is provided in a downward direction from the upper surface nearly at the center of second holding member 32. Since the lower part of pressing member 20 is stored in the stopper hole 33, when an excessive pressing force greater than the above-mentioned force is applied to pressing member 20, the bottom end of pressing member 20 abuts on the inner bottom of stopper hole 33. In this way, insulating substrate 11 is prevented from flexing furthermore, and therefore, insulating substrate 11 is free from plastic deformation. Accordingly, the flexibility of insulating substrate 11 is stabilized, and further, it is possible to improve the reliability of the strain detector.

In addition, a matter of force that pulls up a fixing member (not shown) fastened to external thread 24 of pressing member 20 is examined here. In the strain detector in one preferred embodiment of the present invention, projection 27 is provided around the bottom of insertion hole 26 of first holding member 25. Therefore, an excessive tensile force is applied to the pressing member, causing the pressing member 20 to be pulled upward, and then the upper surface of insulating substrate 11 abuts on projection 27 of first holding member 25. As a result, insulating substrate 11 is prevented from flexing furthermore, and therefore, insulating substrate 11 is free from plastic deformation. Accordingly, the flexibility of insulating substrate 11 is stabilized, and it is possible to improve the reliability of the strain detector.

Preferred Embodiment 2

A strain detector in the preferred embodiment 2 of the present invention will be described in the following discussion with reference to the drawings.

Figure 12:
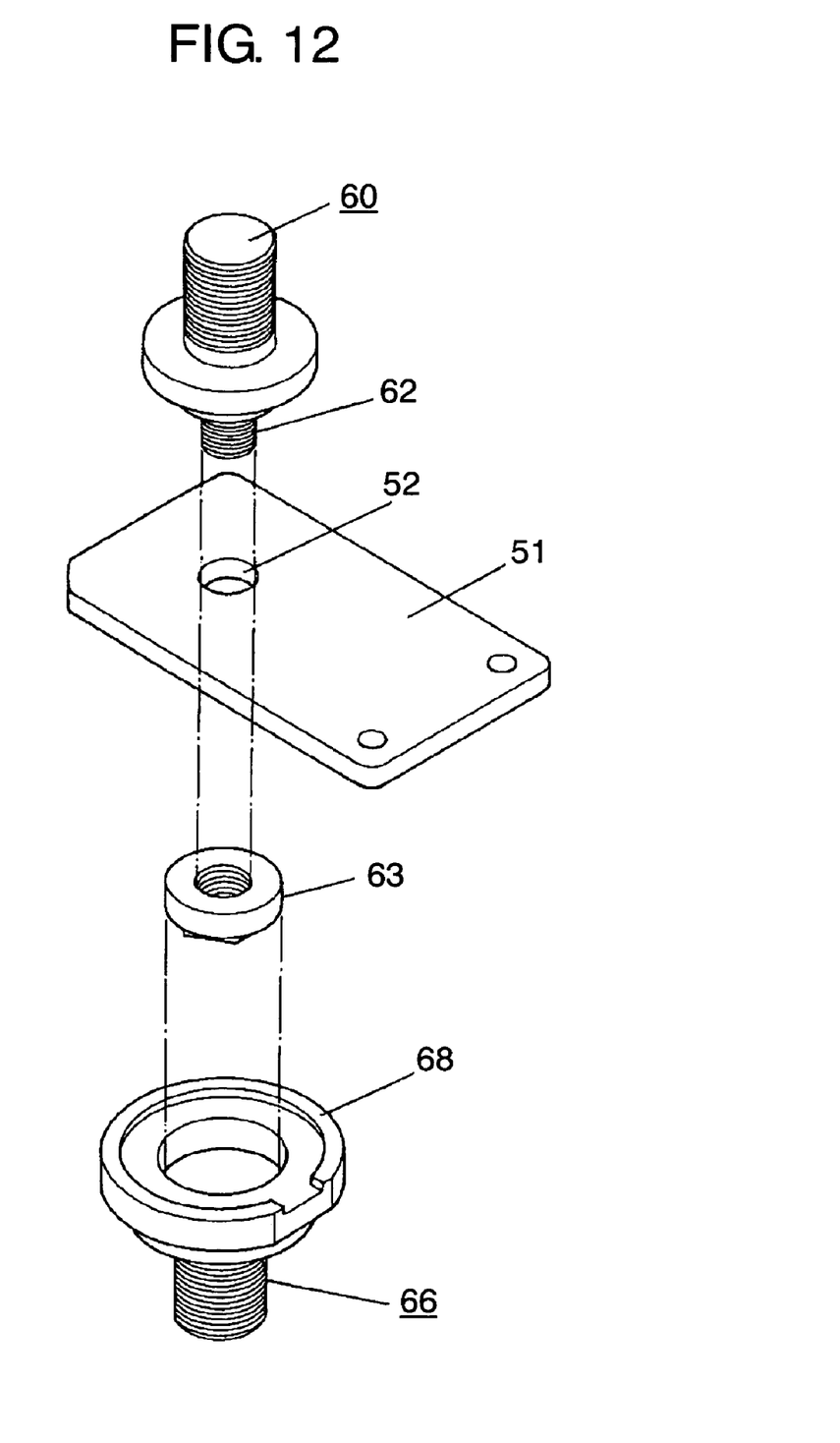
FIG. 12 is an exploded perspective view of a strain detector in one preferred embodiment of the present invention.
Figure 13:
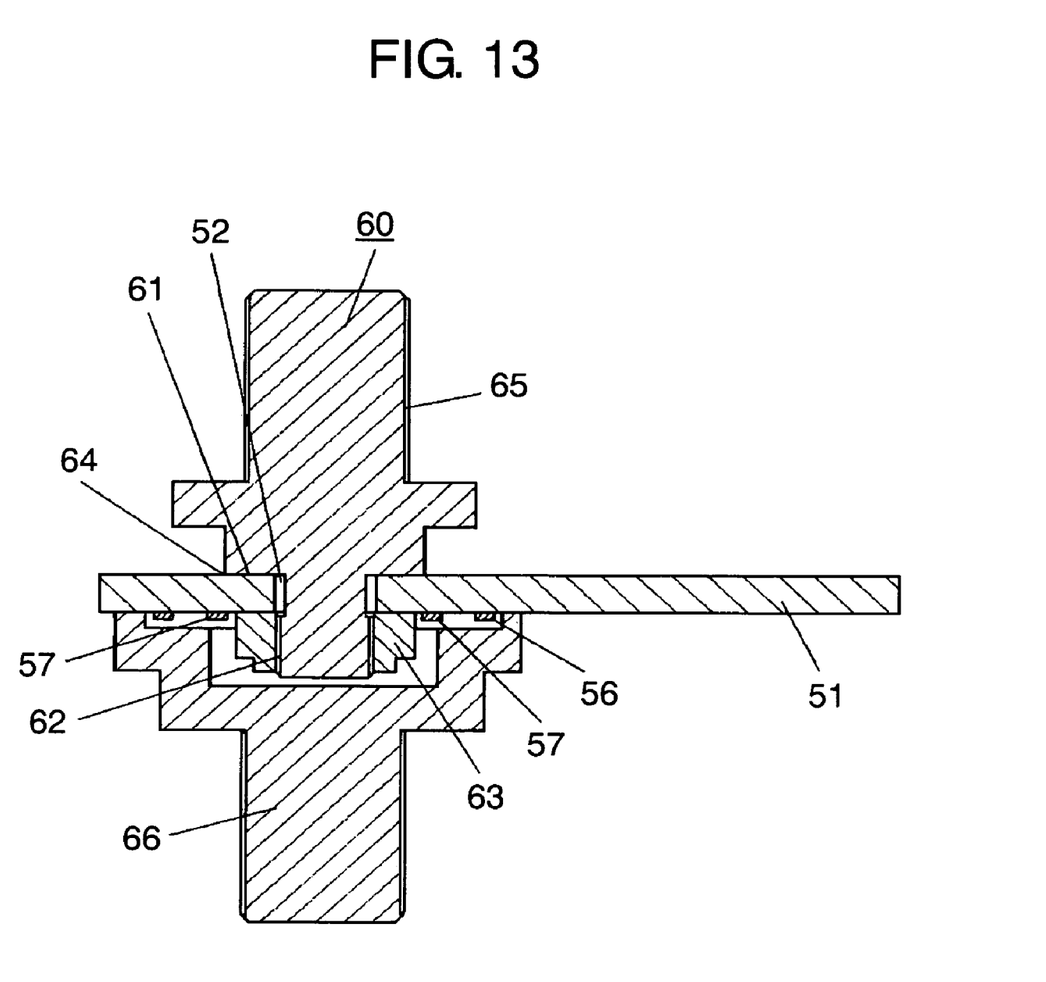
FIG. 13 is a side sectional view of a strain detector in one preferred embodiment of the present invention.
Figure 14:
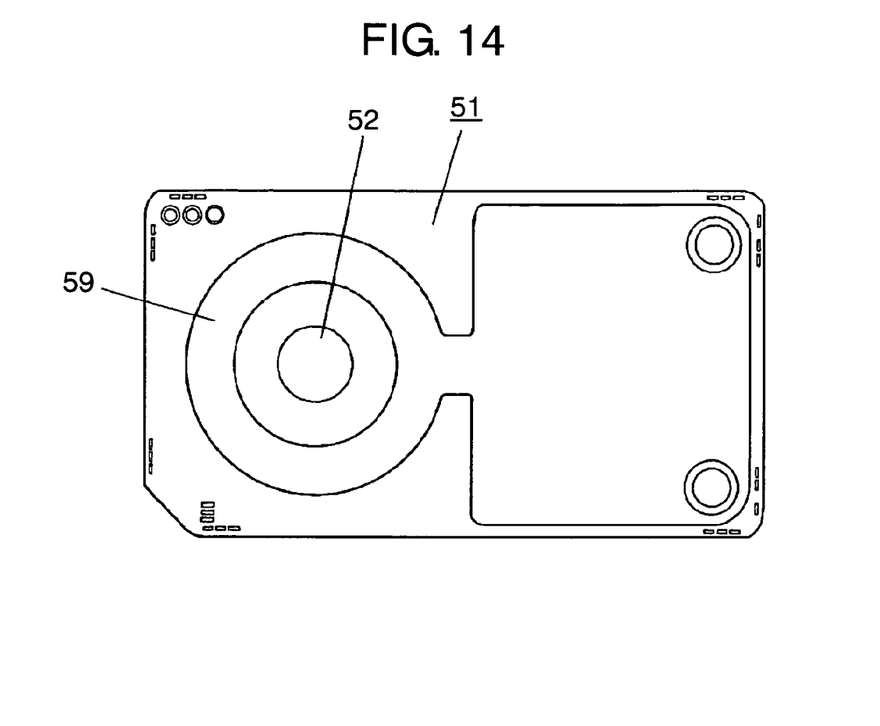
FIG. 14 is a bottom view of an insulating substrate of a strain detector in one preferred embodiment of the present invention.
Figure 15:
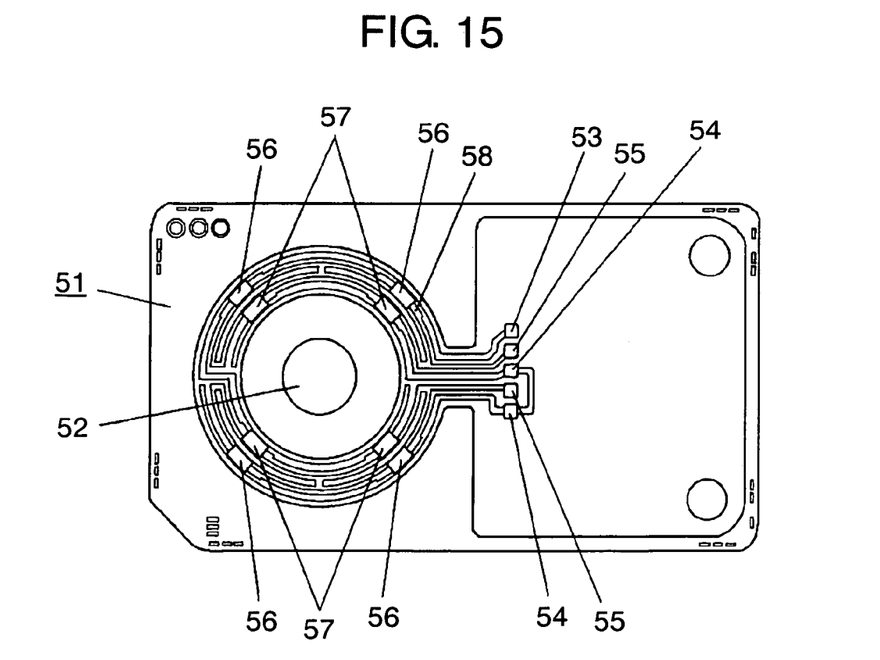
FIG. 15 is a bottom view of an insulating substrate with a protective layer removed therefrom of a strain detector in one preferred embodiment of the present invention.
Figure 16:
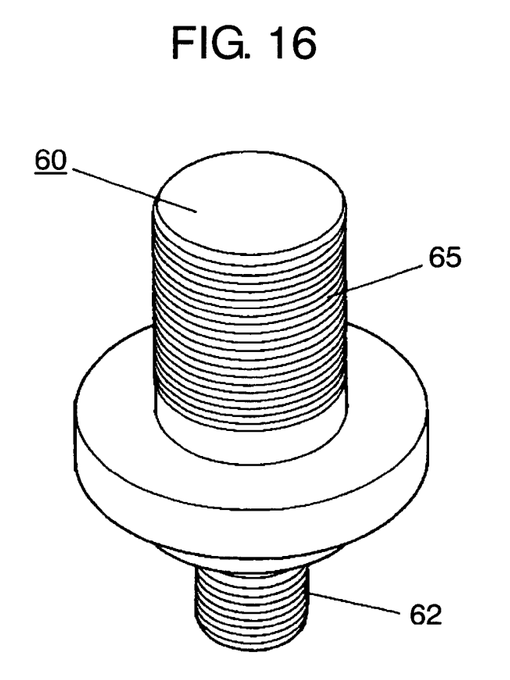
FIG. 16 is a perspective view of a pressing member of a strain detector in one preferred embodiment of the present invention.
Figure 17:
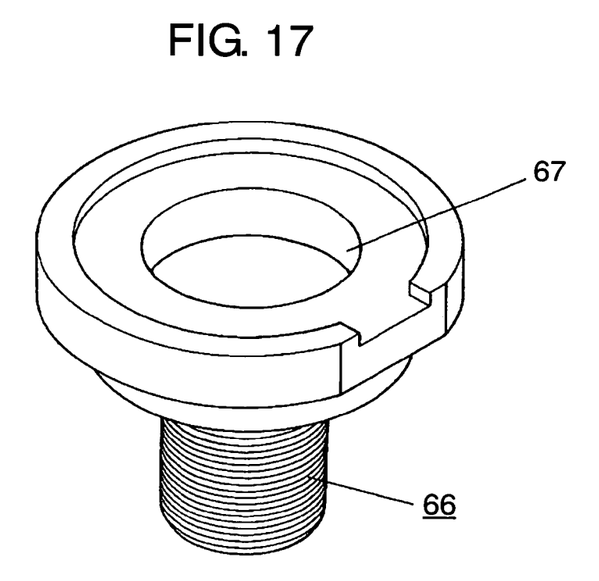
FIG. 17 is a perspective view of a support member of a strain detector in one preferred embodiment of the present invention.

FIG. 12 is an exploded perspective view of a strain detector in the preferred embodiment 2 of the present invention. FIG. 13 is a side sectional view of the strain detector. FIG. 14 is a bottom view of an insulating substrate of the strain detector. FIG. 15 is a bottom view of the insulating substrate with a protective layer removed of the strain detector. FIG. 16 is a perspective view of a pressing member of the strain detector. FIG. 17 is a perspective view of a support member of the strain detector.

In FIG. 12 to FIG. 17, insulating substrate 51 is formed from stainless material containing about 0.1% by weight of nickel, which is generally longitudinal in shape. The insulating substrate 51 is formed with detection hole 52 extending from top to bottom nearly at the center thereof. Also, at the bottom of insulating substrate 51, as shown in FIG. 15, there are provided power electrode 53 made of silver, a pair of GND electrodes 54, a pair of output electrodes 55, four compressive strain resistance elements 56 and tensile strain resistance elements 57 which are electrically connected by circuit 58, thereby forming a bridge circuit. Further, as shown in FIG. 14, protective layer 59 is disposed in such a manner as to cover compressive strain resistance element 56, tensile strain resistance element 57, and circuit 58 at the bottom of insulating substrate 51. Pressing member 60 is formed from stainless material, and the pressing member 60 is provided with abutment 61 which presses a portion adjacent to the top of detection hole 52 of insulating substrate 51, and the outer periphery of abutment 61 is welded to the upper surface of insulating substrate 51. Also, as shown in FIG. 16, external thread 62 is formed over the outside surface of the lower part of pressing member 60.

In addition, external thread 62 protruded downward of pressing member 60 is screwed into fixing member 63 formed of a nut.

Further, fixing member 63 serves to reinforce the fixation of insulating substrate 51 and pressing member 60 welded to each other.

Also, four tensile strain resistance elements 57 in circuit 58 of insulating substrate 51 are disposed under end portion 64 of abutment 61 securing the insulating substrate 51 and pressing member 60. Because four tensile strain resistance elements 57 in circuit 58 of insulating substrate 51 are disposed under end portion 64 of abutment 61 securing the insulating substrate 51 and pressing member 60, a maximum bending stress is applied to tensile strain resistance elements 57 due to the displacement of insulating substrate 51, and as a result, the output signal from tensile strain resistance elements 57 will be increased. Accordingly, it is possible to provide a strain detector improved in output signal sensitivity. Also, external thread 65 is formed over the upper outside surface of pressing member 60. Reference numeral 66 is a support member made of metal, and the top surface of support member 66 is welded to the bottom surface of insulating substrate 51, and it is configured in that the detection hole 52 of insulating substrate 51 is peripherally displaceable in a vertical direction with respect to pressing member 60 and support member 66. Also, depression 67 is formed in the upper surface of support member 66, and external thread 62 and fixing member 63 of pressing member 60 are received in the depression 67.

In this case, since pressing member 60 and support member 66 are welded and fixed onto insulating substrate 51, it is configured in that the detection hole 52 of insulating substrate 51 is peripherally displaceable in a vertical direction with respect to pressing member 53 and support member 66. Accordingly, when fixing the members for example, it is not needed to use fastening members such as screws, and therefore, it is possible to provide a strain detector reduced in size.

Figure 18:
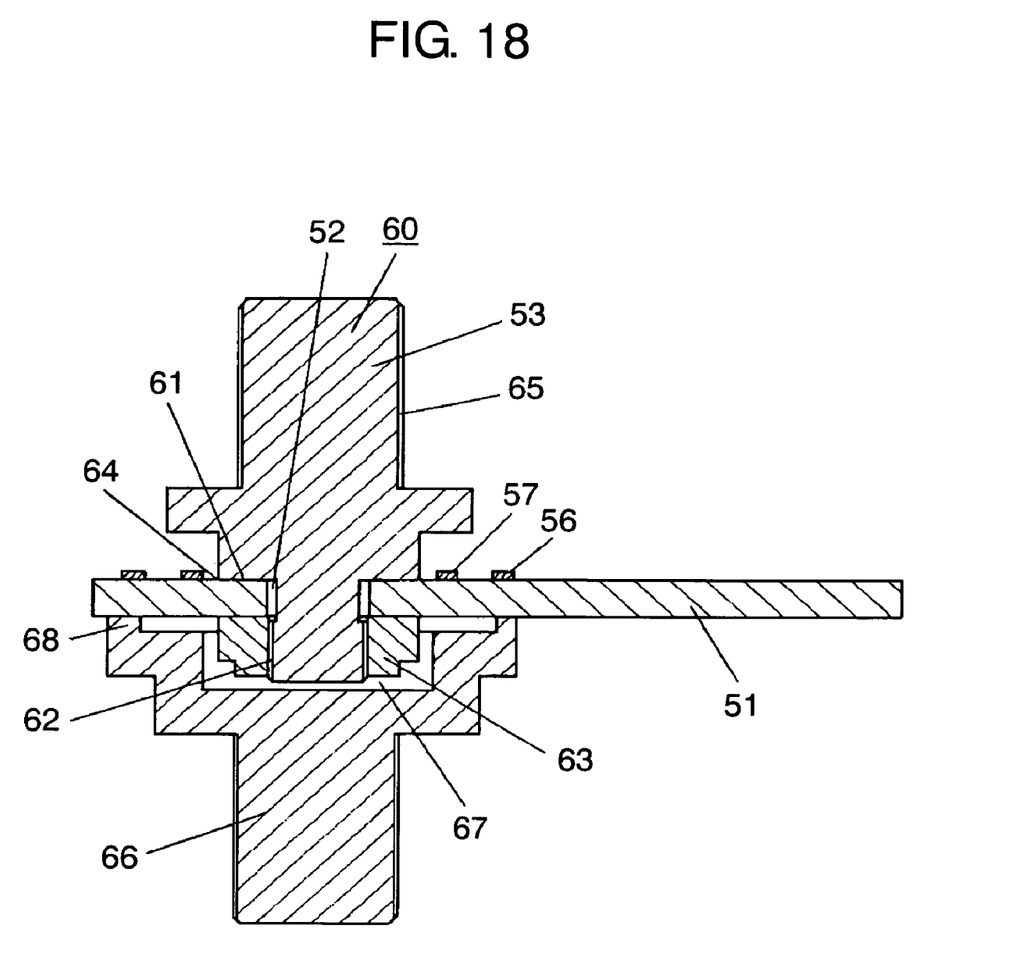
FIG. 18 is a side sectional view of a strain detector in one preferred embodiment of the present invention.

In the strain detector in the preferred embodiment 2 of the present invention, it is configured in that four tensile strain resistance elements 57 in circuit 58 of insulating substrate 51 are disposed under end portion 64 securing insulating substrate 51 and pressing member 60, but as shown in FIG. 18, even when four compressive strain resistance elements 56 in circuit 58 of insulating substrate 51 are disposed above securing member 68 which secures insulating substrate 51 and support member 66, a maximum bending stress is applied to compressive strain resistance element 56 due to the displacement of insulating substrate 51, and as a result, the output signal from compressive strain resistance element 56 will be increased. Accordingly, it is possible to provide a strain detector improved in output signal sensitivity.

As described above, according to the configuration of the present invention, no internal stress due to twisting forces is generated in the insulating substrate, and as a result, there will be no internal stress generated in the strain resistance elements. Accordingly, it is possible to improve the output signal accuracy of the strain detector.

Also, in the configuration of the present invention, the change in resistance value of the strain detect element due to internal stress generated in the insulating substrate when holding the insulating substrate between holding members can be corrected by IC. Thus, it is possible to further improve the output signal accuracy of the strain detector.

Also, according to the configuration of the present invention, the pressing member is provided with an abutment, and the abutment presses a portion adjacent to the upper surface of the detection hole in the insulating substrate, and as a result, it is not necessary to integrate the pressing member with the insulating substrate. In this way, the pressing member and the insulating substrate can be formed by using different materials. Accordingly, it is possible to configure the insulating substrate by using a material that is less in change of linear expansion coefficient due to temperature change and capable of enduring the printing and burning of strain resistance elements and to configure the pressing member by using a highly durable material Also, in the configuration of the present invention, the detent of the pressing member is stopped by a stop portion disposed at the first holding member. Therefore, when the pressing member of the strain detector is screwed to a fixing member, an excessive rotational torque is applied to the pressing member, and then, the detent of the pressing member is stopped after rotating against the first holding member. As a result, the engagement of the external thread of the pressing member and the nut is not loosened by excessive forces applied. Accordingly, it is possible to improve the reliability in fixing the strain detector on the fixing member.

Also, according to the configuration of the present invention, a stopper hole is formed in a downward direction from the upper surface nearly at the center of the other holding member, and the lower part of the pressing member is received in the stopper hole. As a result, when an excessive pressing force is applied from above to the pressing member, the bottom end of the pressing member abuts on the inner bottom of the stopper hole. Thus, the insulating substrate is prevented from flexing furthermore, and therefore, the insulating substrate is free from plastic deformation. Accordingly, the flexibility of the insulating substrate is stabilized, and it is possible to improve the reliability of the strain detector.

Also, in the configuration of the present invention, since a projection is disposed around the bottom surface of the insertion hole in the first holding member, when an excessive tensile force is applied to the pressing member, causing the pressing member to be pulled upward, then the upper surface of the insulating substrate abuts on the projection of the first holding member. Thus, the insulating substrate is prevented from flexing furthermore, and the insulating substrate is free from plastic deformation. Accordingly, the flexibility of the insulating substrate is stabilized, and it is possible to improve the reliability of the strain detector.

Also, in the configuration of the present invention, since a projection is disposed around the upper surface of the stopper hole in the second holding member, when an excessive pressing force is applied from above to the pressing member, the lower surface of the insulating substrate abuts on the projection of the other holding member. Thus, the insulating substrate is prevented from flexing furthermore, and the insulating substrate is free from plastic deformation. Accordingly, the flexibility of the insulating substrate is stabilized, and it is possible to improve the reliability of the strain detector.

Also, in the configuration of the present invention, even when an excessive pressing force is applied from above to the pressing member, the strain resistance element of the insulating substrate will not abut on the projection of the other holding member. As a result, the strain resistance element is free from generation of scratches, and since the strain resistance element of the insulating substrate is disposed at a position opposite to a projection-free portion, the pattern arrangement of the insulating substrate is reduced in size. Accordingly, it is possible to provide a small-sized strain detector.

Also, in the configuration of the present invention, since the insulating substrate is held between the holding abutment of one holding member and the holding abutment of the other holding member, the machining accuracy of the holding abutment is the deciding factor for the internal stress generated in the insulating substrate with the insulating substrate held between holding members. Therefore, it is possible to assure the output characteristic of the strain detector.

INDUSTRIAL APPLICABILITY

The strain detector of the present invention is less in internal stress generated in the strain resistance element, and can also be used as a strain detector which may improve the output signal accuracy.

The invention claimed is:

1. A strain detector comprising:
an insulating substrate having at least two strain resistance elements and a circuit electrically connected to the strain resistance elements; and
a pair of holding members for holding the insulating substrate, the insulating substrate being sandwiched between the holding members,
wherein the insulating substrate includes a detection hole provided nearly at the center of the insulating substrate, and a fixing hole provided at a peripheral end zone of the insulating substrate;
a portion around the detection hole is pressed by a pressing member;
each of the holding members is provided with a fixing hole arranged so as to oppose the fixing hole of the insulating substrate; and
a fixing member is inserted into the fixing holes of the holding members and the fixing hole of the insulating substrate so as to secure the peripheral end zone of the insulating substrate,
wherein the portion around the detection hole in the insulating substrate is flexible in a vertical direction with respect to the pair of holding members,
and wherein the portion around the detection hole in the insulating substrate faces the holding members across a gap.

2. The strain detector of claim 1,
wherein holding abutments are formed close to fixing holes respectively provided in the pair of holding members, and the insulating substrate is held between these holding abutments.

3. The strain detector of claim 1, comprising a circuit board provided with IC for correcting the change in resistance value of strain resistance elements of the insulating substrate.

4. The strain detector of claim 1, wherein
one holding member, out of the pair of holding members, is provided with an insertion hole opposing to the detection hole of the insulating substrate;
a pressing member is inserted into the insertion hole;
a projection disposed extending from the end of the pressing member is inserted into the detection hole of the insulating substrate; and
the projection is fixed by a fixing member, and thereby, the end of the pressing member is abutted on a portion around the detection hole of the insulating substrate.

5. The strain detector of claim 4, wherein a detent is formed at the end position of the pressing member, and the detent is stopped by a stop portion provided at one of the holding members.

6. The strain detector of claim 4,
wherein the other holding member, out of the pair of holding members, is provided with a depression which receives a fixing member for fixing a projection extended from the end of the pressing member; and
with respect to the depression and the fixing member, when the insulating substrate is held between the pair of holding members, a gap is created between the end of the fixing member and the inner bottom of the depression.

7. The strain detector of claim 4,
wherein the one of the holding members includes a projection positioned around the insertion hole of the one of the holding members, and a portion of the insulating substrate around the detection hole is abutted onto the projection around the insertion hole if an excessive tensile force is applied to the pressing member.

8. The strain detector of claim 6,
wherein the other of the holding members includes a projection positioned around the depression of the other of the holding members, and a portion of the insulating substrate around the detection hole is abutted onto the projection around the insertion hole if an excessive tensile force is applied to the pressing member.

9. The strain detector of claim 7,
wherein the projection is composed of a plurality of separate projections; and
the strain resistance elements of the insulating substrate are disposed so as to oppose projection-free portions between the separate projections.

* * * * *